United States Patent [19]

Ross, Jr.

[11] 4,050,555
[45] Sept. 27, 1977

[54] TROLLEY RAIL ASSEMBLY

[75] Inventor: Donald R. Ross, Jr., Pittsburgh, Pa.

[73] Assignee: U-S Safety Trolley Corporation, Pittsburgh, Pa.

[21] Appl. No.: 689,782

[22] Filed: May 25, 1976

[51] Int. Cl.² .......................................... B60M 1/34
[52] U.S. Cl. .................................. 191/23 A; 191/25; 191/33 R; 174/97; 339/22 T
[58] Field of Search ............... 191/22 R, 23 R, 23 A, 191/25, 29 R, 30, 31, 33 R, 35; 174/95, 97, 98, 99 R, 99 B; 339/22 B, 22 T

[56] References Cited

U.S. PATENT DOCUMENTS

| | | | |
|---|---|---|---|
| 2,495,526 | 1/1950 | King | 191/23 A |
| 3,303,293 | 2/1967 | Howell | 191/23 A |
| 3,590,173 | 6/1971 | Stahmer | 191/23 A |
| 3,772,482 | 11/1973 | Ross | 191/23 R |
| 3,825,672 | 7/1974 | Malon | 174/97 |
| 3,826,880 | 7/1974 | Ross | 191/25 |

*Primary Examiner*—Trygve M. Blix
*Assistant Examiner*—Reinhard J. Eisenzopf
*Attorney, Agent, or Firm*—Brown, Murray, Flick & Peckham

[57] ABSTRACT

An extruded plastic housing of indefinite length contains an electrical conductor bar in a slot extending lengthwise of the housing. The bar is retained in the slot by a pair of ribs integral with the side walls of the slot and extending lengthwise thereof and projecting toward each other. The width of the bar is greater than the space between the ribs, but the housing is so formed that in assembling it and the bar the distance between the ribs can be increased temporarily by pressure of the bar against them to permit it to be moved rearwardly past the ribs, whereby the bar can be inserted from the front or outer side of the slot, thus permitting the use of a single conductor bar regardless of the number of housing units that may be disposed end to end to form the housing.

3 Claims, 4 Drawing Figures

U.S. Patent  Sept. 27, 1977  4,050,555
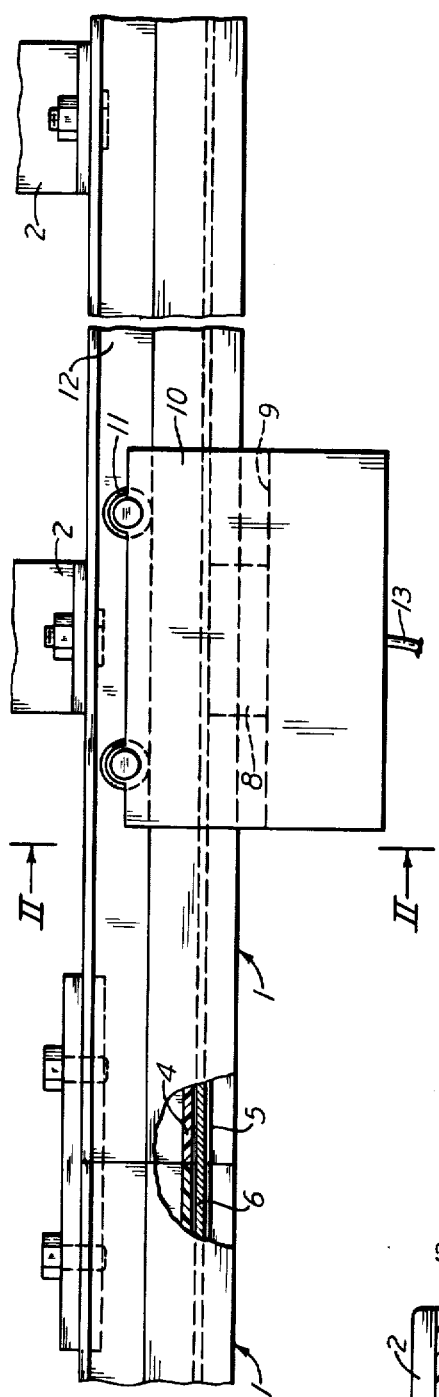
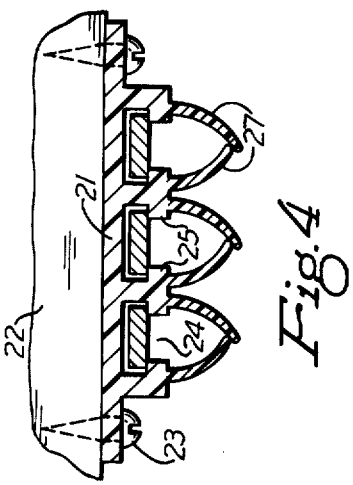
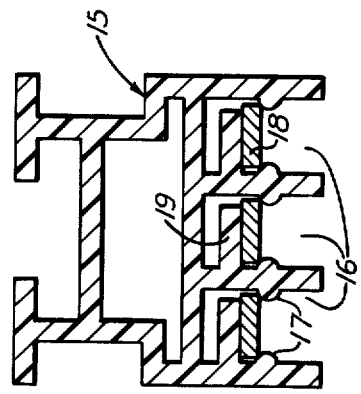
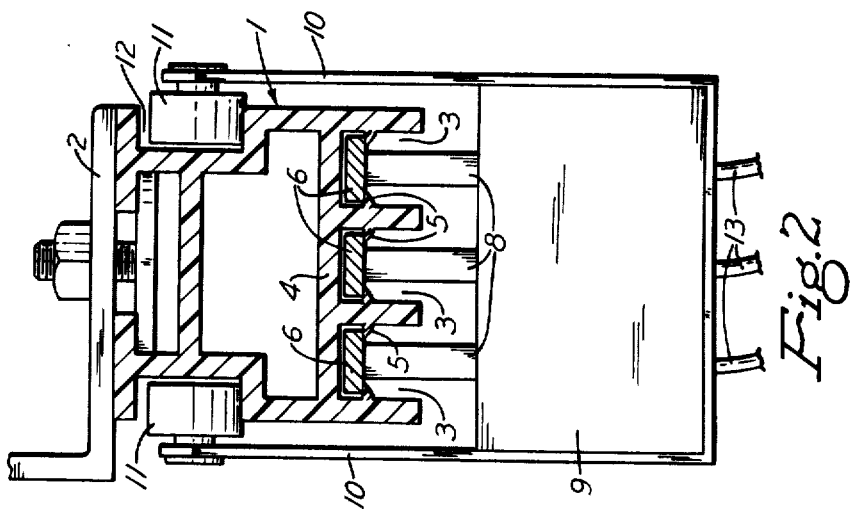

TROLLEY RAIL ASSEMBLY

In my U.S. Pat. No. 3,772,482 a trolley rail unit is shown which includes extrusions of insulating material in the form of rigid tubular housings having a lower or front side provided with parallel slots extending lengthwise of the housings for receiving electric current pick-up members that are movable lengthwise of the housing. Supported in the upper or inner ends of these slots are metal conductor bars, which conduct electric current that they supply to the pick-up members. Three slots and three conductors are shown so that three pick-up members can be used. The extruded housings made in accordance with my patent are relatively short, compared with the overall length of the system. For example, they usually are about twenty feet long, so they must be connected end to end to obtain the desired length. The conductor bars are inserted in each rigid housing from one end of it. Since the bars are substantially the same length as the individual housings, the bars also must be connected end to end at the joints between the housings. In a rail system a hundred feet or more in length, this means a great many joints in the conductor bars, which is undesirable. On the other hand, to install the housings before the bars are inserted in their slots and then to attempt to insert long continuous bars lengthwise into the slots is extremely difficult and in many cases impossible, due to friction between the bars and the extruded housings and possible slight misalignment of the housings with one another. Even if friction did not interfere with inserting a bar through several of the housings disposed end to end, its leading end might jam against the end of the next housing and refuse to go any further.

It is an object of this invention to provide a trolley rail assembly which is formed from extruded plastic conductor-housing means of any desired length, made in such a manner that a conductor bar can be inserted from the open side of the bar-receiving slot in the housing means, whereby a single bar as long as the housing means can readily be inserted even if the housing means is made up of a number of separate housings disposed end to end.

The invention is illustrated in the accompanying drawings, in which

FIG. 1 is a fragmentary side view, partly in section;

FIG. 2 is an enlarged cross section taken on the line II—II of FIG. 1;

FIG. 3 is a cross section of a modification; and

FIG. 4 is a cross section of a still further embodiment of the invention.

Referring to FIGS. 1 and 2 of the drawings, a rigid housing 1 of any desired length, such as ten to twenty feet, is extruded from a suitable plastic, for example, high impact polyvinyl chloride. The housing preferably has a generally rectangular outline in cross section and may be tubular to reduce its weight, to provide a duct for wires and for other purposes. This housing is connected end to end with other like housings in order to form continuous housing means of any desired length. The tops or backs of the housings, depending upon whether the housings are installed as shown or on their sides, are rigidly connected to suitable supports 2. The opposite side of each housing, which is the bottom or front side, is provided with one or more slots 3 extending lengthwise of it. The inner sides of the slots opposite their open sides are closed by a partition wall 4 that extends across them and forms the lower or front wall of the tubular portion of the housing. Extending lengthwise along the opposite side walls of each slot is a pair of retaining ribs 5 that project toward each other. They are integral with the side walls. Supported by each pair of ribs is an electrical conductor bar 6 that is wider than the space between the ribs, which therefore hold the bar in operative position above them. The depth of the slots is such that the exposed lower surfaces of the conductor bars are spaced a considerable distance above the bottom of the housing so that there is little danger of something accidentally coming in contact with the recessed bars, which conduct electricity. The rigid housings are structural members that insulate and support the electrical conductors without the necessity of further components. That is, the plastic housings do not have to be mounted in metal housings to reinforce and stiffen them, which would increase the cost considerably. The conductor bars are held securely in place in a simple manner and are protected by the portions of the housings projecting below them.

The conductor bars 6 are engaged by current pick-up members that extend into the slots. These may be trolley wheels or sliding shoes supported in any suitable manner. For example, contact shoes 8 may be mounted on the base 9 of a trolley that has upwardly extending side flanges 10 straddling the bar housing and provided with wheels 11 that travel along the opposite sides of the housing in channels 12 that form tracks for the wheels. The contact shoes are electrically connected inside the trolley to conductors 13, by which current is carried away from them.

It is a feature of this invention that the conductor bars, unlike in my above-mentioned patent, do not have to be inserted from the ends of the rigid housings but can be inserted in the housings from below. This permits the use of a single conductor bar of continuous unbroken length in each row of aligned slots, thereby avoiding joints in the bar. The bar can be as long as the total length of the housings containing it. To permit the bar to be inserted in a slot from its open bottom, each housing is composed of material of two different durometers. That is, the retaining ribs 5 are not nearly so hard as the rest of the housing, so that they can be compressed or bent upwardly when a conductor bar is pressed upwardly against them. They are bent far enough to permit the bar to pass between them, and then they return to their original position in which they support the bar, as shown in FIG. 2.

In installing such a rail system the required number of bar housings 1 are attached to their supports 2 in end to end relationship to form one continuous housing means. Then a metal conductor bar 6 can be pulled from a reel on which it is wound and pushed up into the slots in the housings and past the retaining ribs 5. In this way, joints in the conductor bar are avoided, since it forms an unbroken conductor from end to end of the aligned housings. The bar is flexible enough to be coiled in any length on a reel for shipment and handling before installation, but once it is in place in its supporting housings, it is rigid for all intents and purposes.

In the modification shown in FIG. 3, each bar housing 15 may have the same general configuration as the one first described and can be made of the same material, except that the plastic of the modified housing has the same durometer throughout the housing. Likewise, the side walls of the slots 16 include opposed retaining ribs 17 extending lengthwise thereof for supporting electrical conductor bars 18. To permit the bars to be inserted from below so that it will not be necessary to have joints in the bars when a plurality of the housings are disposed end to end, the side walls of the slots are wider or deeper than those first described. They may also be made somewhat thinner if desired, the purpose being to provide side walls with enough "give" to permit them to be sprung apart temporarily far enough to allow conductor bars to be pushed up between the ribs. The side walls will then return to their parallel position, with their ribs supporting the bars.

Since it is desirable that the bars not be supported by the ribs above the open bottoms of the slots any greater distance than those in the first embodiment, there is considerable space above the bars. To hold the bars down against the contact shoes sliding along their lower surfaces, each slot is provided with a back-up ledge 19 extending lengthwise of the slot and integral with one of its side walls. The ledge extends nearly across the width of the slot, but is not secured to the other side wall, whereby the ledge will not interfere with spreading of the side walls while the bar is being inserted in the housing. The ledge prevents a contact shoe from lifting the bar above the ribs any appreciable distance.

In the further embodiment shown in FIG. 4, the housing means for the conductor bars, instead of being formed from a series of rigid housings of predetermined length, is a single housing of indefinite length. This housing is extruded from a suitable plastic that has a durometer that gives it enough flexibility for it to be coiled on a reel for storage and handling before it is installed in a trolley system. As will be seen, the housing has a flat back wall 21, that can be placed flat against a support 22, with the opposite edges of the back wall rigidly connected to the support by screws 23 or clips. Extending downwardly from this back wall are the parallel side walls of slots 24 that extend lengthwise of the housing. These slots contain continuous electric conductor bars that may be the same length as the housing. The bars are flexible enough to be coiled with the housing on a reel. The bars are supported in the slots by retaining ribs 25 projecting toward each other from the lower edges of the slot side walls. The ribs are spaced far enough apart to permit a trolley wheel or contact shoe to extend up between them and into contact with the bottom of a bar. One way of inserting the conductor bars in the slots is to move the bars inwardly between the ribs as the side walls of the slots are sprung farther apart to permit the bars to pass the ribs. Then the side walls and ribs return to their original position and hold the bars in place. Another method of insertion is to slide the conductor bars lengthwise into the slots from one end of the plastic housing.

Since the slots are quite shallow and, therefore, the bars are close to the open bottoms of the slots, it is desirable to provide means for guarding against accidental contact with the bars. This can be done by flexible guard strips 27 converging downwardly from the bottoms of the side walls. These strips substantially engage each other along their lower edges, except in the area where a trolley shoe extends up between them and holds them apart. The strips are integral with the housing, but they are of a different durometer so that they will be much more flexible. When the assembly is coiled on a reel, the flexible guard strips are folded down or flattened in each convolution by the convolution wrapped around it.

With a trolley rail assembly as just described in connection with FIG. 4, the conductor bars not only are jointless, but there is no need to connect relatively short bar housings end to end because the disclosed housing also is jointless and can be installed in any desired length.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A trolley rail assembly comprising extruded plastic housing means of indefinite length for supporting an electrical conductor bar, the housing means having a back formed for fastening to a support, said housing means having a front side provided with a slot extending lengthwise thereof for receiving an electric current pick-up member movable lengthwise of the housing means, a pair of retaining ribs integral with the side walls of the slot and extending lengthwise thereof and projecting from those walls toward each other, a single continuous electric conductor bar disposed in said slot in operative position behind said ribs, the width of the bar being greater than the space between the ribs and less than the space between said side walls in front of the ribs, and said housing means being so formed that in assembling the housing means and the bar the distance between said ribs can be increased temporarily by pressure of the bar against them to permit the bar to be moved rearwardly past the ribs into said operative position, whereby the bar can be inserted from the front side of the slot, the ribs being the sole means for supporting the bar in said operative position, and flexible guard strips integral with the outer ends of the side walls of said slot and extending lengthwise thereof, said strips converging forward and being of less hardness than said housing means, said housing means and guard strips and conductor bar being flexible enough to be coiled before installation.

2. A trolley rail assembly comprising a plurality of extruded rigid plastic housings of relatively short length disposed end to end for supporting an electrical conductor bar extending unbroken from housing to housing, each of the housings having a back formed for fastening to a support, said housings having a front side provided with a slot extending lengthwise thereof for receiving an electric current pick-up member movable lengthwise of the housings, a pair of retaining ribs integral with the side walls of the slot and extending lengthwise thereof and projecting from those walls toward each other, a single continuous electric conductor bar disposed in said slot in operative position behind said ribs, the width of the bar being greater than the space between the ribs and less than the space between said side walls in front of the ribs, all of the plastic forming the housings having the same hardness but said side walls being of such width and thickness that they can be sprung away from each other far enough to permit the conductor bar to be moved rearwardly past said ribs into said operative position, whereby the bar can be inserted from the front side of the slot, the ribs being the sole means for supporting the bar in said operative position, and each housing including a rigid ledge inside said slot between said rear wall and said ribs and extending lengthwise of the slot, the ledge being spaced from said rear wall and integral with only one of the side walls of the slot and extending across the slot behind the bar.

3. A trolley rail assembly comprising a plurality of extruded rigid plastic housings of relatively short length disposed end to end for supporting an electrical conductor bar extending unbroken from housing to housing, each of the housings having a back formed for fastening to a support, said housings having a front side provided with a slot extending lengthwise thereof for receiving an electric current pick-up member movable lengthwise of the housings, a pair of retaining ribs integral with the side walls of the slot and extending lengthwise thereof and projecting from those walls toward each other, and a single continuous electric conductor bar disposed in said slot in operative position behind said ribs, the width of the bar being greater than the space between the ribs and less than the space between said side walls in front of the ribs, and the plastic forming said retaining ribs being of less hardness than the rest of each housing so that the ribs can be bent rearwardly by said bar when it it pressed rearwardly against them to permit the bar to be moved rearwardly past the ribs into said operative position, whereby the bar can be inserted from the front side of the slot, the ribs being the sole means for supporting the bar in said operative position.

* * * * *